United States Patent
Lair (10) Patent No.: US 12,072,342 B2
(45) Date of Patent: Aug. 27, 2024

(54) APPARATUS FOR TRANSPORTING SAMPLE RECEPTACLE CARRIERS

(71) Applicant: GEN-PROBE INCORPORATED, San Diego, CA (US)

(72) Inventor: Gary Lair, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 1443 days.

(21) Appl. No.: 15/828,885

(22) Filed: Dec. 1, 2017

(65) Prior Publication Data

US 2018/0180634 A1 Jun. 28, 2018

Related U.S. Application Data

(60) Provisional application No. 62/429,393, filed on Dec. 2, 2016.

(51) Int. Cl.
*G01N 35/04* (2006.01)
*G01N 1/14* (2006.01)
(Continued)

(52) U.S. Cl.
CPC ......... *G01N 35/00732* (2013.01); *G01N 1/14* (2013.01); *G01N 35/0099* (2013.01);
(Continued)

(58) Field of Classification Search
CPC .... G01N 2035/0477; G01N 1/28; G01N 1/00; G01N 1/286; G01N 1/38; G01N 35/00;
(Continued)

(56) References Cited

U.S. PATENT DOCUMENTS 4,801,429 A * 1/1989 Torfs ................. G01N 25/4853
414/793
5,720,377 A * 2/1998 Lapeus ................. G01N 35/04
198/465.1
(Continued)

FOREIGN PATENT DOCUMENTS

CN 104053997 * 12/2016
EP 0619267 A1 * 10/1994
(Continued)

OTHER PUBLICATIONS

International Preliminary Report on Patentability, PCT Application No. PCT/US2017/064179, Jun. 4, 2019.
(Continued)

*Primary Examiner* — Jamel E Williams
*Assistant Examiner* — Alex T Devito
(74) *Attorney, Agent, or Firm* — Sterne, Kessler, Goldstein & Fox P.L.L.C.; Charles B. Cappellari (57) ABSTRACT

A laboratory automated system can include a host conveyor assembly configured to transport a plurality of carriers and receptacles coupled thereto between at least a sample processing instrument and at least one assay instrument. The system includes an intermediate conveyor assembly configured to transport a plurality of carriers and receptacles coupled thereto from within sample processing instrument to the host conveyor assembly. The system also includes an intermediate conveyor assembly for each assay instrument configured to transport a plurality of carriers from host conveyor assembly to a respective processing position within the assay instrument. The intermediate conveyor assembly coupled to the assay instrument can include a buffer conveyor subassembly configured to receive carriers from the host conveyor assembly, and a spur conveyor
(Continued)

assembly configured to transport a carrier to the processing position of the assay instrument.

6 Claims, 10 Drawing Sheets

(51) Int. Cl.
    *G01N 35/00*         (2006.01)
    *G01N 35/02*         (2006.01)
    *G01N 35/10*         (2006.01)

(52) U.S. Cl.
    CPC ........... *G01N 35/021* (2013.01); *G01N 35/10* (2013.01); *G01N 2001/1418* (2013.01); *G01N 2035/0467* (2013.01); *G01N 2035/0477* (2013.01)

(58) Field of Classification Search
    CPC ............... G01N 1/14; G01N 35/00732; G01N 35/0099; H01L 2924/0002
    USPC .......................................................... 73/863
    See application file for complete search history.

(56) References Cited

U.S. PATENT DOCUMENTS

| | | | |
|---|---|---|---|
| 7,028,831 | B2 | 4/2006 | Veiner |
| 9,446,911 | B2* | 9/2016 | Habrich ............... B65G 47/901 |
| 9,726,686 | B2* | 8/2017 | Mellars ............ G01N 35/00722 |
| 10,010,885 | B2* | 7/2018 | Edwards ................. B01L 3/523 |
| 11,511,283 | B2* | 11/2022 | Combs ............... G01N 35/0099 |
| 2001/0048894 | A1* | 12/2001 | Schmidt ............. G01N 35/1097 |
| | | | 422/63 |
| 2005/0194237 | A1* | 9/2005 | Veiner .................... G01N 35/04 |
| | | | 198/619 |
| 2007/0116613 | A1* | 5/2007 | Elsener ............... B01L 3/50255 |
| | | | 422/400 |
| 2012/0037585 | A1* | 2/2012 | Jene ...................... B66C 23/905 |
| | | | 212/276 |
| 2013/0065797 | A1* | 3/2013 | Silbert ...................... G01N 1/31 |
| | | | 73/304 C |
| 2013/0126302 | A1* | 5/2013 | Johns ..................... G01B 11/08 |
| | | | 198/465.1 |
| 2014/0305227 | A1* | 10/2014 | Johns ...................... B04B 13/00 |
| | | | 73/863.01 |
| 2016/0060680 | A1* | 3/2016 | Buse ..................... C12Q 1/6806 |
| | | | 506/9 |
| 2016/0080630 | A1* | 3/2016 | Kuwata ............. H04N 1/32776 |
| | | | 348/207.1 |
| 2016/0256866 | A1* | 9/2016 | Nichols ................. B01L 3/0227 |
| 2016/0320423 | A1* | 11/2016 | Hoffmann ........ G01N 35/00732 |
| 2017/0254827 | A1* | 9/2017 | Walker ............. G01N 35/00732 |

FOREIGN PATENT DOCUMENTS

| | | | | |
|---|---|---|---|---|
| EP | 3064947 | A1 * | 9/2016 | ............. G01N 35/04 |
| WO | WO-2011064200 | A1 * | 6/2011 | ........... B65G 47/848 |

OTHER PUBLICATIONS

PCT, International Search Report and Written Opinion, International Application No. PCT/US2017/064179, Apr. 11, 2018.
EPO extended European search report, European Application No. 23209202.3, Feb. 6, 2024.

\* cited by examiner

FIG. 12

APPARATUS FOR TRANSPORTING SAMPLE RECEPTACLE CARRIERS

BACKGROUND

Field

Embodiments of this disclosure relate to laboratory automated instruments, systems, and methods for transporting sample receptacle carriers.

Background

Laboratory automated instruments and systems can have automated assemblies that transport samples among various positions within a laboratory. For example, the samples can be contained in receptacles, and the receptacles can be coupled to carriers (e.g., pucks). To transport the carriers and, in turn, the receptacles containing the samples, the carriers can be selectively coupled to a movable dock. The dock can move the carrier among the various positions within the laboratory system or instrument.

SUMMARY

In some embodiments, an apparatus for transporting a sample receptacle carrier includes a movable dock configured to support a sample receptacle carrier. The movable dock may include a first magnet configured to magnetically couple with a magnetic portion of the sample receptacle carrier. The magnetic coupling may secure the sample receptacle carrier to the dock.

The dock may include a second magnet coupled to the dock configured to engage the magnetic section of the sample receptacle carrier. Alternatively, the first and second magnet can be coupled to other sections of the apparatus for moving a sample receptacle carrier. The magnets can be permanent or electromagnets and can be composed of a variety of materials including, but not limited to, neodymium.

The apparatus for moving a sample receptacle carrier may also include a sensor to detect the presence of the sample receptacle carrier adjacent to the dock. The sensor may transmit a signal to a controller. The controller may active an electromagnet in the dock.

The apparatus for moving a sample receptacle carrier may also include a carrier support portion. The carrier support portion may have a surface on which the sample receptacle carrier may rest. The sample receptacle carrier may further include a second portion extending from the dock to contact a portion of the sample receptacle carrier. One or more magnets can be coupled to or contained within this second portion extending from the dock.

The second portion may include a cavity to house the magnet. The second portion may also include a contoured surface. The contoured surface may match or substantially match the peripheral shape of the sample receptacle carrier. The sample receptacle carrier can be spaced apart from the periphery of the first magnet even when the sample receptacle carrier is electromagnetically coupled to the first magnet.

The apparatus can be coupled to a drive assembly to move the apparatus from a first position to a second position. The drive assembly may include a track between the first position and the second position. The drive assembly may include a motor, a first pulley coupled to the motor, a second pulley, a drive belt connecting the first pulley and the second pulley, and drive pulley. The drive pulley may move along the drive pulley when the first pulley is turned by the motor.

The apparatus for moving a sample receptacle carrier may acquire the sample receptacle carrier at pick up location. The pickup location may include a diverter. The diverter may move the sample receptacle carrier from a conveyor assembly to a position adjacent to the dock. In this way, the dock may engage the sample receptacle carrier. The diverter can be a disc diverter.

In some embodiments, a method of processing a sample containing receptacle coupled to a sample receptacle carrier includes moving the sample receptacle carrier adjacent to a movable dock. The dock may include a magnet to magnetically couple a magnetic portion of the sample receptacle carrier to secure the sample receptacle carrier to the dock. The dock may move the sample receptacle carrier from a first position to a second position while the dock has engaged a sample receptacle carrier.

The method of moving the sample receptacle carrier may further include moving the sample receptacle carrier onto a carrier support portion of the dock. The method may also include diverting the sample receptacle carrier from a conveyor assembly to the dock. The movement of the sample receptacle carrier to the dock and the magnetic coupling of the sample receptacle carrier to the dock may occur at substantially simultaneously (i.e., at the same time or close to the same time). Additionally, the dock may include a permanent magnet and the coupling of the sample receptacle carrier and the dock occurs when a magnetic portion of the sample receptacle carrier is within a magnetic field of the permanent magnet. The method may also include an electromagnet configured to couple the magnetic portion of the sample receptacle carrier with the magnet on the dock when the electromagnet is activated by the sample receptacle carrier adjacent to the movable dock. In some embodiments, the magnetic coupling may occur after moving the sample receptacle carrier adjacent to the movable dock. The magnetic coupling of the magnetic portion of the sample receptacle carrier with the magnet on the dock may comprise activating the electromagnet. The magnetic coupling of the magnetic portion of the sample receptacle carrier with the magnet on the dock may also occur before the sample receptacle carrier engages the dock.

In some embodiments, the dock is configured to move the sample receptacle carrier from a first position to a second position. The second position can be within a sample processing instrument. A portion of the sample contained in the sample receptacle can be aspirated using an automated pipettor at the second position. The sample receptacle can be manipulated at the second location using a robotic arm. The manipulating the sample containing receptacle may include removing the sample receptacle from the sample receptacle carrier and moving the sample receptacle to another location either inside or outside of an instrument. In some embodiments, the instrument can be configured to assay the sample by subjecting a portion of the sample to nucleic acid amplification reaction conditions.

The locations of the first position and the second position can be within or outside of a sample processing instrument. The dock coupled to the sample receptacle carrier may also move to a third position. The third position can be located at the sample position as either first or the second location. In some embodiments, the dock may magnetically decouple the magnetic portion of the sample receptacle carrier at the third position. The sample receptacle carrier may them move away from the sample receptacle carrier dock.

In some embodiments, a sample processing instrument may include a transport apparatus configured to move a sample receptacle carrier. The transport apparatus may include a movable dock configured to support the sample receptacle carrier. The movable dock can be configured to move from a first position to a second position. The dock may include a magnet configured to magnetically couple a magnetic portion of the sample receptacle carrier to secure the sample receptacle carrier to the dock. The dock may move the sample receptacle carrier to a location so that an automated pipettor may aspirate at least a portion of a sample from the sample receptacle coupled to the sample receptacle carrier.

The sample processing instrument may also include a second magnet coupled to the dock and which can be used to magnetically couple with the magnetic portion of the sample receptacle carrier. The first magnet or the second magnet can be either permanent magnets or electromagnets. The magnets can be comprised of a variety of materials including, but not limited to, neodymium.

In some embodiments, the sample processing instrument may include a sensor to detect the location of the sample receptacle carrier. The sensor may detect the presence of the sample receptacle carrier when it is adjacent to the dock. A controller can be operatively coupled to the sensor and an electromagnet and may active the electromagnet when the sensor senses that the sample receptacle carrier is properly located.

The dock of the sample receptacle carrier transport of the instrument may include a carrier support portion configured to support the carrier. The sample receptacle carrier may also include a second portion extending from the carrier support portion and configured to contact a portion of the sample receptacle carrier. The magnets can be coupled to this second portion of the dock. The sample processing instrument's sample receptacle carrier transport second portion may include a cavity to house the magnets.

The second portion may have a surface that is contoured to substantially match the peripheral shape of the sample receptacle carrier. The surface may also separate the magnets from the magnetic portion of the sample receptacle carrier.

The sample processing instrument may have a drive assembly configured to move the dock from a first position to a second position. The drive assembly may include a sample receptacle carrier dock track along which the dock can move from the first position to the second position. The drive assembly may include a motor, a first pulley coupled to the motor, a second pulley, a drive belt connecting the first pulley and the second pulley, and drive pulley. The drive pulley may move along the drive pulley when the first pulley is turned by the motor. The sample processing instrument may have a diverter to move the sample receptacle carrier to a position adjacent to the dock. The diverter can be a disc diverter.

In some embodiments, a sample processing instrument may include an apparatus configured to move a sample receptacle carrier. The apparatus may include a movable dock that can move from a first position to a second position. The dock may include a magnet which may magnetically couple with a magnetic portion of the sample receptacle carrier. The magnetic coupling may secure the sample receptacle carrier to the dock. The dock may carry the sample receptacle carrier to a position where a robotic may configured to manipulate a sample containing receptacle may engage the sample containing receptacle.

In some embodiments, the dock may include a second magnet configured to magnetically couple with the magnetic portion of the sample receptacle carrier. The first and the second magnet can be permanent or electromagnets. The permanent magnets can be neodymium magnets.

The sample processing instrument can be configured to detect the location of the sample receptacle carrier using a sensor. The sensor may communicate with a controller operatively coupled to one of the electromagnets. When the sensor senses that the sample receptacle carrier is in a select location, the controller may activate the electromagnet.

In some embodiments, the sample processing instrument may include the dock which has a carrier support portion which supports the sample receptacle carrier. The dock may further include a second portion extending from the carrier support portion and configured to contact a portion of the sample receptacle carrier. The first or the second magnet can be coupled to this second portion extending from the carrier. The second portion may include a surface contoured to substantially match the peripheral shape of the sample receptacle carrier. This surface may allow be between at least one of the magnets and the magnetic portion of the sample receptacle carrier.

The sample processing instrument may have a drive assembly configured to move the dock from a first position to a second position. The drive assembly may include a sample receptacle carrier dock track along which the dock can move from the first position to the second position. The drive assembly may include a motor, a first pulley coupled to the motor, a second pulley, a drive belt connecting the first pulley and the second pulley, and drive pulley. The drive pulley may move along the drive pulley when the first pulley is turned by the motor. The sample processing instrument may have a diverter to move the sample receptacle carrier to a position adjacent to the dock. The diverter can be a disc diverter.

DESCRIPTION OF THE DRAWINGS

The accompanying drawings, which are incorporated herein and form a part of the specification, illustrate embodiments of the present disclosure by way of example, and not by way of limitation. Together with the description they further serve to explain principles of the invention and enable a personal skilled in the pertinent art to make and use the invention.

The features and advantages of the embodiments will become more apparent from the detailed description set forth below when taken in conjunction with the drawings, in which like reference characters identify corresponding elements throughout.

DETAILED DESCRIPTION

The present disclosure will now be described in detail with reference to embodiments thereof as illustrated in the accompanying drawings. References to "one embodiment," "an embodiment," "some embodiments," "an exemplary embodiment," "for example," "an example," "exemplary," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "a" or "an" means "at least one" or "one or more."

As used herein, a "sample" refers to any material to be analyzed, regardless of the source. The material can be in its native form or any stage of processing (e.g., the material can be chemically altered or it can be one or more components of a sample that have been separated and/or purified from one or more other components of the sample). A sample can be obtained from any source, including, but not limited to, an animal, environmental, food, industrial or water source Animal samples include, but are not limited to, peripheral blood, plasma, serum, bone marrow, urine, bile, mucus, phlegm, saliva, cerebrospinal fluid, stool, biopsy tissue including lymph nodes, respiratory tissue or exudates, gastrointestinal tissue, cervical swab samples, semen or other body or cellular fluids, tissues, or secretions. Samples can be diluted or contained within a receptacle containing diluents, transport media, preservative solution, or other fluids. As such, the term "sample" is intended to encompass samples contained within a diluent, transport media, and/or preservative or other fluid intended to hold a sample.

As used herein, a "sample receptacle" refers to any type of fluid container, including, for example, a tube, vial, cuvette, cartridge, microtiter plate, etc., that is configured to contain a sample at a point during processing. Exemplary sample receptacles include Aptima® collection and transport tubes (Hologic, Inc., Bedford, MA).

As used herein, a "sample containing receptacle" refers to any type of sample receptacle that contains a sample or a portion thereof.

As used herein, a "carrier" refers to any device that is configured to operatively couple to at least one sample receptacle for transporting the receptacle.

As used herein, a "sample processing instrument" refers to any instrument capable of performing a processing step on a sample contained within a receptacle. A sample processing instrument includes any instrument capable of performing an assay on a sample and rendering a result. For example, a sample processing instrument includes any instrument capable of performing an assay on a sample to determine the presence of an analyte in the sample. Any instrument capable of performing a hybridization assay, a molecular assay including a nucleic-acid-based amplification reaction, a sequencing assay, an immunoassay, or chemistry assay on a sample is included in this definition of a sample processing instrument. Exemplary sample processing instruments capable of performing an assay on a sample to determine the presence of an analyte in the sample include the Tigris® and Panther® systems sold by Hologic, Inc., Bedford, MA, the diagnostic instrument systems disclosed in U.S. Pat. No. 6,335,166, which is incorporated herein by reference, as well as any of the diagnostic instruments disclosed in U.S. Patent Application Publication No. 2016/0060680, published Mar. 3, 2016, which is incorporated herein by reference. A sample processing instrument also includes any instrument that only performs sample preparation steps and is not capable of analyzing a sample and/or rendering a result. For example, an instrument that transfers a sample from one receptacle to another receptacle or adds one substance to a receptacle containing a sample, but does not perform an assay on the sample, is a sample processing instrument. And, for example, an instrument that only performs sample preparation steps to isolate and/or purify an analyte of interest is a sample processing instrument. An exemplary sample processing instrument that only performs sample preparation steps is the Tomcat® system sold by Hologic, Inc., Bedford, MA and the instrument systems disclosed in U.S. Pat. No. 9,335,336, which is incorporated herein by reference.

As used herein, a "robotic arm" refers to an electromechanical device that translates a payload (e.g., a pipettor, a receptacle gripper (such as a pick-and-place claw), a camera, a sensor, a capper/decapper, etc.) in the X, Y, and/or Z directions. In an embodiment, a robotic arm can move in the X, Y, and Z directions.

In some embodiments, a sample receptacle carrier transport apparatus is configured to move a sample receptacle carrier between different positions. For example, in some embodiments, the transport apparatus can move a sample receptacle carrier (1) from a conveyor assembly to a sample processing instrument, (2) from a position within a sample processing instrument to another position within the sample processing instrument, (3) from one sample processing instrument to another sample processing instrument, or (4) any combination thereof. In some embodiments, the transport apparatus includes a movable dock configured to couple with the sample receptacle carrier, thereby securing the carrier to the dock, and configured to move the carrier between different positions. The transport apparatus can also include at least one magnet that magnetically couples the sample receptacle carrier to the dock in some embodiments. The transport apparatus can compose part of a sample processing instrument or part of a conveyor assembly in some embodiments.

Referring collectively to FIGS. 1-7, a sample receptacle carrier transport apparatus 100 can be configured to transport a sample receptacle carrier 202. The carrier 202 being transported can be coupled to a sample receptacle 200 in some embodiments. And in some embodiments, sample receptacle 200 (coupled to carrier 202) contains a sample. In other embodiments, the sample receptacle 200 coupled to the carrier 202 being transported is empty. And in some embodiments, the sample receptacle carrier 202 being transported is not coupled to a sample receptacle 200.

Transport apparatus 100 can include a movable dock 102. Dock 102 is configured to releasably couple, directly or indirectly, with carrier 202 such that dock 102 can support and move carrier 202 while coupled thereto. Coupling between dock 102 and carrier 202 occurs when movement of carrier 202 relative to dock 102 is substantially prevented during the ordinary use of transport apparatus 100. For example, when carrier 202 is coupled to dock 102, carrier 202 moves along with dock 102 as dock 102 moves. Decoupling between dock 102 and carrier 202 occurs when carrier 202 can move relative to dock 102 during the ordinary use of transport apparatus 100. In some embodiments, transport apparatus 100 includes one or more magnets 108 configured to releasably and magnetically couple with a magnetic portion 204 of a carrier 202 (which is described further below with reference to FIG. 8). For example, as shown in FIGS. 1-7, dock 102 can include two magnets 108. In other embodiments, dock 102 can include one or more than two magnets 108. Magnets 108 can be coupled, for example, fixedly, to a portion of dock 102. When magnets 108 are magnetically coupled to magnetic portion 204 of carrier 202, carrier 202 is releasably and securely coupled to dock 102 such that carrier 202 moves along with dock 102 as dock 102 moves. In some embodiments, the strength of magnets 108 is such that movement of carrier 202 relative to dock 102 is substantially prevented when carrier 202 is magnetically coupled to dock 102 during the ordinary use of transport apparatus 100.

In some embodiments, magnets 108 are permanent magnets. For example, magnets 108 can be composed of neodymium or any other suitable magnetic materials, such as samarium cobalt, alnico, ceramic, or ferrite. In some permanent magnet embodiments, carrier 202 can be coupled to dock 102 by positioning carrier 202 relative to dock 102 such that at least a portion of magnetic portion 204 of carrier 202 is within the magnetic field generated by permanent magnets 108. And in some permanent magnet embodiments, carrier 202 can be decoupled from dock 102 by directly or indirectly applying a force to carrier 202 that exceeds the magnetic coupling force between magnetic portion 204 of carrier 202 and magnets 108. A diverter or other controllable actuator can apply this decoupling force to carrier 202 in some embodiments.

In some embodiments, magnets 108 are electromagnets configured to be selectively activated when at least a portion of at least a portion of magnetic portion 204 of carrier 202 is within the magnetic field generated by activated magnets 108, thereby magnetically coupling magnetic portion 204 of carrier 202 with magnets 108. For example, transport apparatus 100 can be configured to activate electromagnets 108 when a sample receptacle carrier 202 is adjacent dock 102, for example, when carrier 202 is positioned on dock 102. And in some electromagnet embodiments, carrier 202 can be decoupled from dock 102 by deactivating magnets 108, thereby eliminating or at least reducing the attractive magnetic coupling force between the magnetic portion 204 of carrier 202 and magnets 108.

In some embodiments, dock 102 includes at least one permanent magnet 108 in combination with at least one electromagnet. For example, magnets 108 may include a permanent magnet that, when magnetically coupling to the magnetic portion 204 of carrier 202, is not sufficient to secure carrier 202 to dock 102 without an additional magnetic force provided by an electromagnet.

Figure 8:
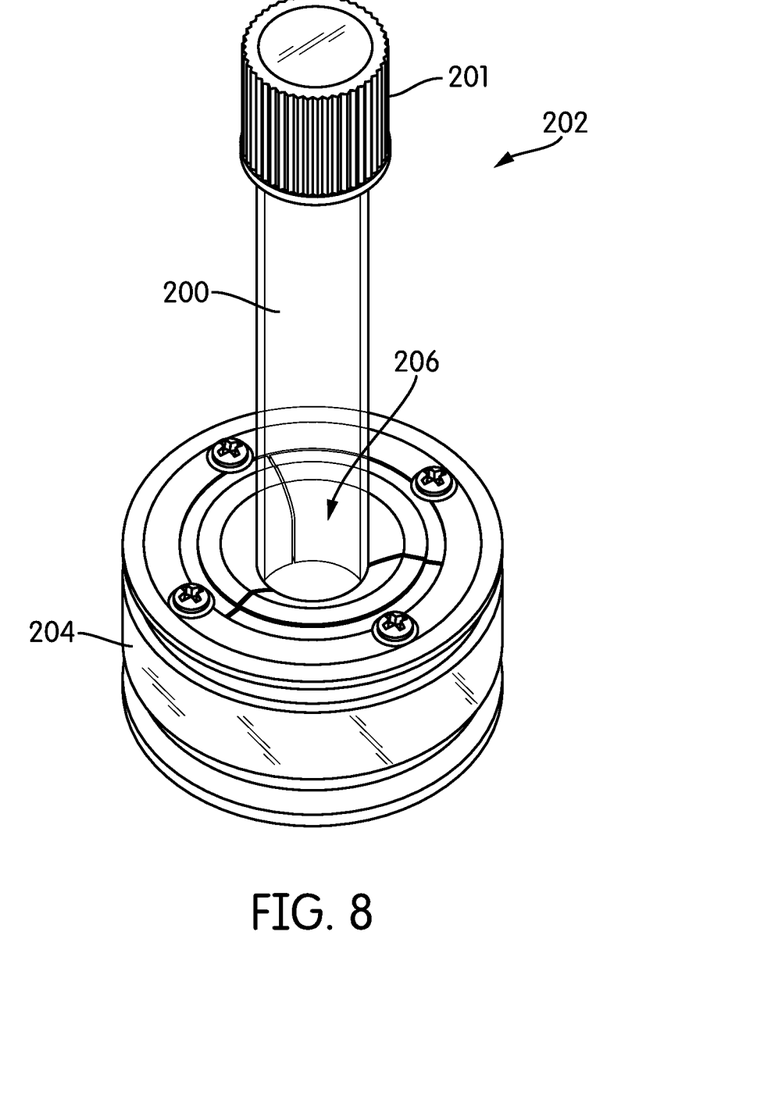
FIG. 8 is a perspective view of a sample receptacle carrier coupled to a sample receptacle, according to an embodiment.

FIG. 8 schematically illustrates an embodiment of sample receptacle 200 and carrier 202. Carrier 202 can be configured to maintain the orientation of receptacle 200 coupled thereto as transport apparatus 100 moves carrier 202. For example, in some embodiments, carrier 202 is a puck having a cylindrical body defining a recess 206 configured to receive a portion of receptacle 200. In some puck embodiments, carrier 202 includes a clamping device configured to apply a retaining force to receptacle 200 placed within recess 206 of carrier 202 such that receptacle 200 is retained within carrier 202. Sample receptacle 200 may contain a sample, such as an animal sample. Sample receptacle 200 may have a sample receptacle cap 201 to close sample receptacle 200. Sample receptacle cap 201 may have an upper surface through which a pipettor or other sample collect may pass to aspirate a portion of a sample contained with sample receptacle 200.

Carrier 202 can also include a magnetic portion 204. Magnetic portion 204 can be composed of any magnetic material, for example, any ferromagnetic material such as iron, nickel, cobalt, or alloys thereof, that is operationally compatible with magnets 108. In some embodiments, magnetic portion 204 defines at least a portion of the exterior of carrier 202. And in some embodiments, magnetic portion 204 can be positioned around substantially the entire periphery of sample receptacle carrier 202. For example, magnetic portion 204 can be a circumferential band composed of a magnetic material that extends around the entire circumference of carrier 202. In this way, sample receptacle carrier 202 can be magnetically coupled with magnets 108 of transport apparatus 100 regardless of the rotational orientation of carrier 202. In some embodiments, magnetic portion 204 can be within sample receptacle carrier 202—not on an exterior portion of carrier 202. In other embodiment, magnetic portion 204 can be positioned around the periphery and extend within the sample receptacle carrier 202.

Figure 6:
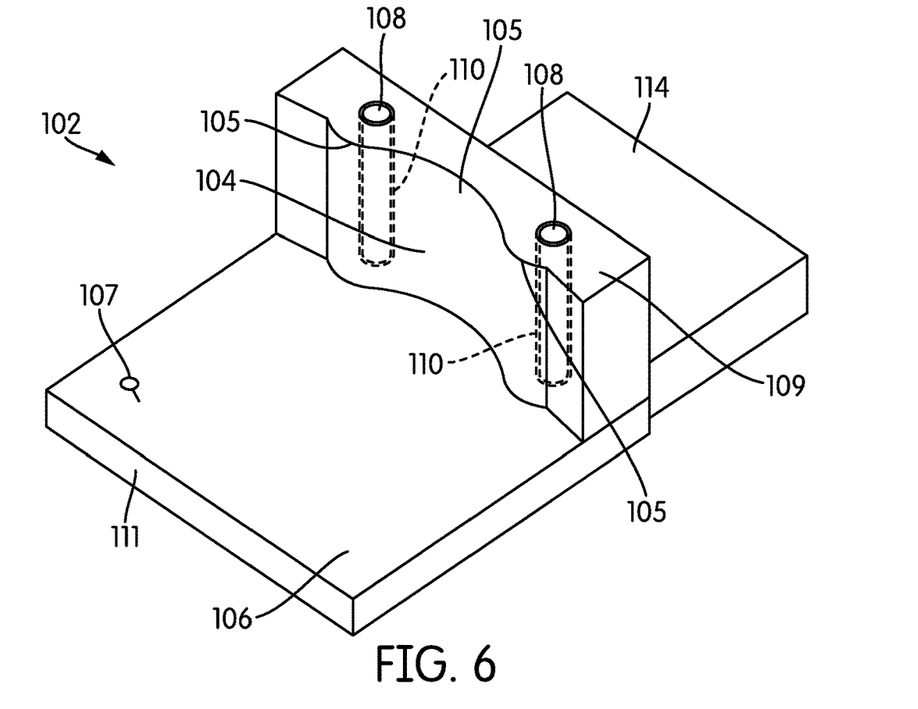
FIG. 6 is a perspective view of a dock of a sample receptacle carrier transport apparatus, according to an embodiment.
Figure 7:
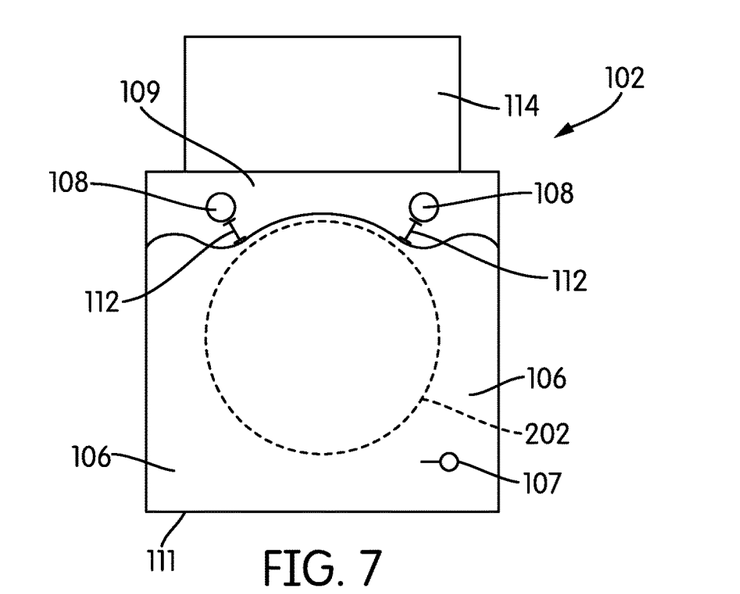
FIG. 7 is a plan view of a dock of a sample receptacle carrier transport apparatus, according to an embodiment.

Turning back to FIGS. 1-7, dock 102 can include a first carrier support portion 106 in some embodiments. First carrier support portion 106 can be configured to support carrier 202 when sample transport apparatus 100 is moving carrier 202 between positions. For example, as best seen in FIGS. 6 and 7, first carrier support portion 106 can define a surface 107 configured to engage a portion, for example, a bottom portion, of carrier 202. In some embodiments, surface 107 is a horizontal, planar surface on which carrier 202 can sit.

Dock 102 can also include a second carrier support portion 109 adjacent first carrier support portion 106 in some embodiments. For example, second carrier support portion 109 can extend, for example, upwardly, from surface 107 of first carrier support portion 106. In some embodiments, second carrier support portion 109 is spaced apart from an end 111 of dock 102 such that the entire carrier 202 can sit on surface 107. In some embodiments, first carrier support portion 106 and second carrier support portion 109 are integral as best seen in FIGS. 6 and 7.

Second carrier support portion 109 of dock 102 can define a surface 104 configured to engage at least a portion, for example, a side portion, of carrier 202. Accordingly, in some embodiments, when carrier 202 is positioned on first carrier support portion 106 of dock 102, carrier 202 may contact surface 104 defined by second carrier support portion 109.

Second carrier support portion 109 can stop movement of carrier 202 relative to dock 102 in a direction away from distal end 111 of dock 102.

Surface 104 can be contoured to substantially match the contour of at least a portion of carrier 202 in some embodiments. For example, if carrier 202 is a circular puck, surface 104 can have a complementary circular concave portion 105 that substantially matches the contour of carrier 202. In such embodiments, a portion of carrier 202 can be received within the recess defined by concave portion 105 (which has a contour that substantially matches the contour of the periphery of carrier 202) thereby reducing or eliminating movement of sample receptacle carrier 202 relative to dock 102 in a transverse direction. For example, if movement of carrier 202 is initiated in the transverse direction, carrier 202 will contact surface 104 of concave portion 105, thereby preventing further movement of carrier 202 in the transverse direction. In some embodiments, the substantially matching contours can also help carrier 202 self-align into the desired position on dock 102. For example, carrier 202 can contact surface 104 which, in turn, guides carrier 202 into the desired position on dock 102.

Figure 4:
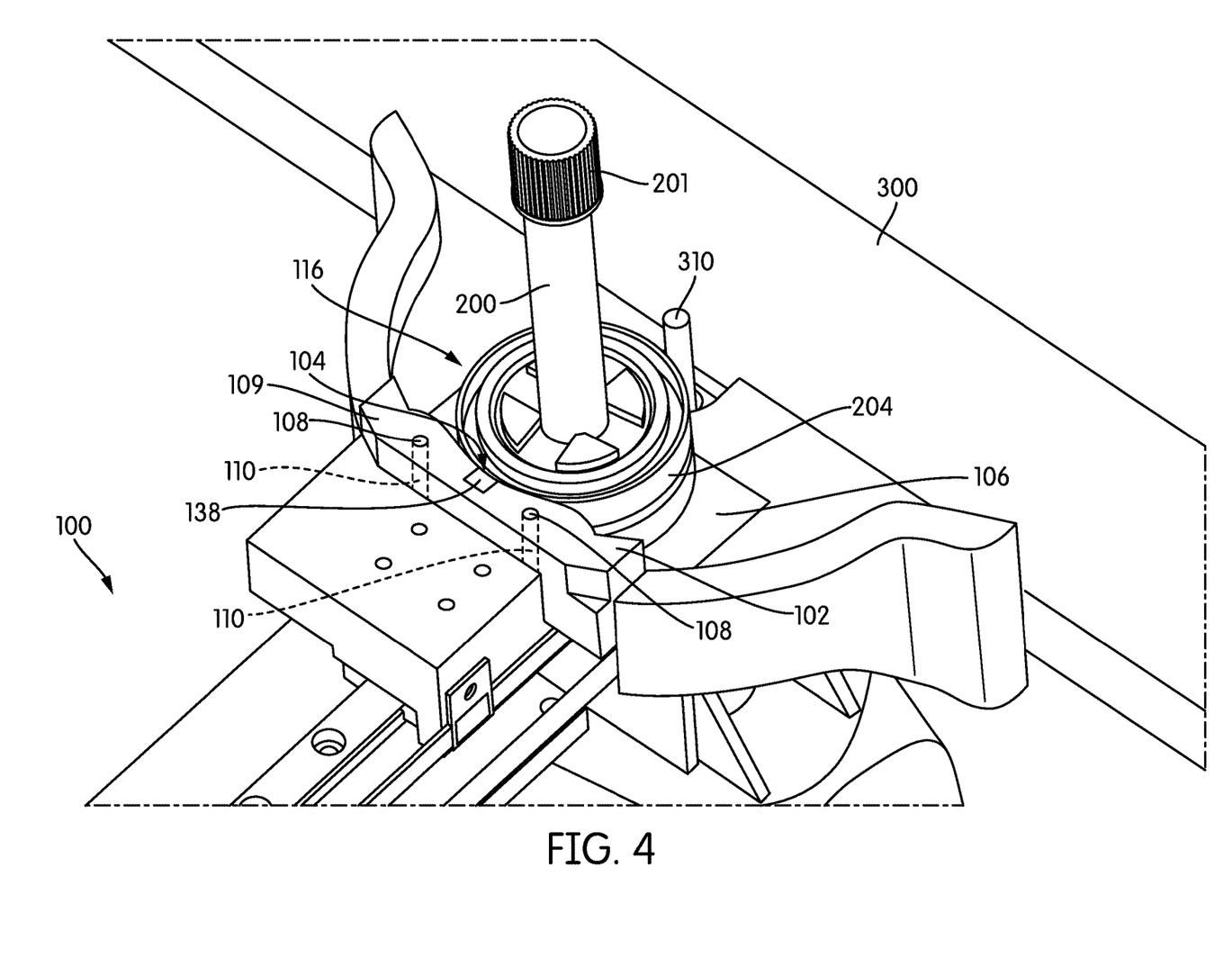
FIG. 4 is a partial perspective view of a sample receptacle carrier transport apparatus with a dock at a first position, according to an embodiment.
Figure 5:
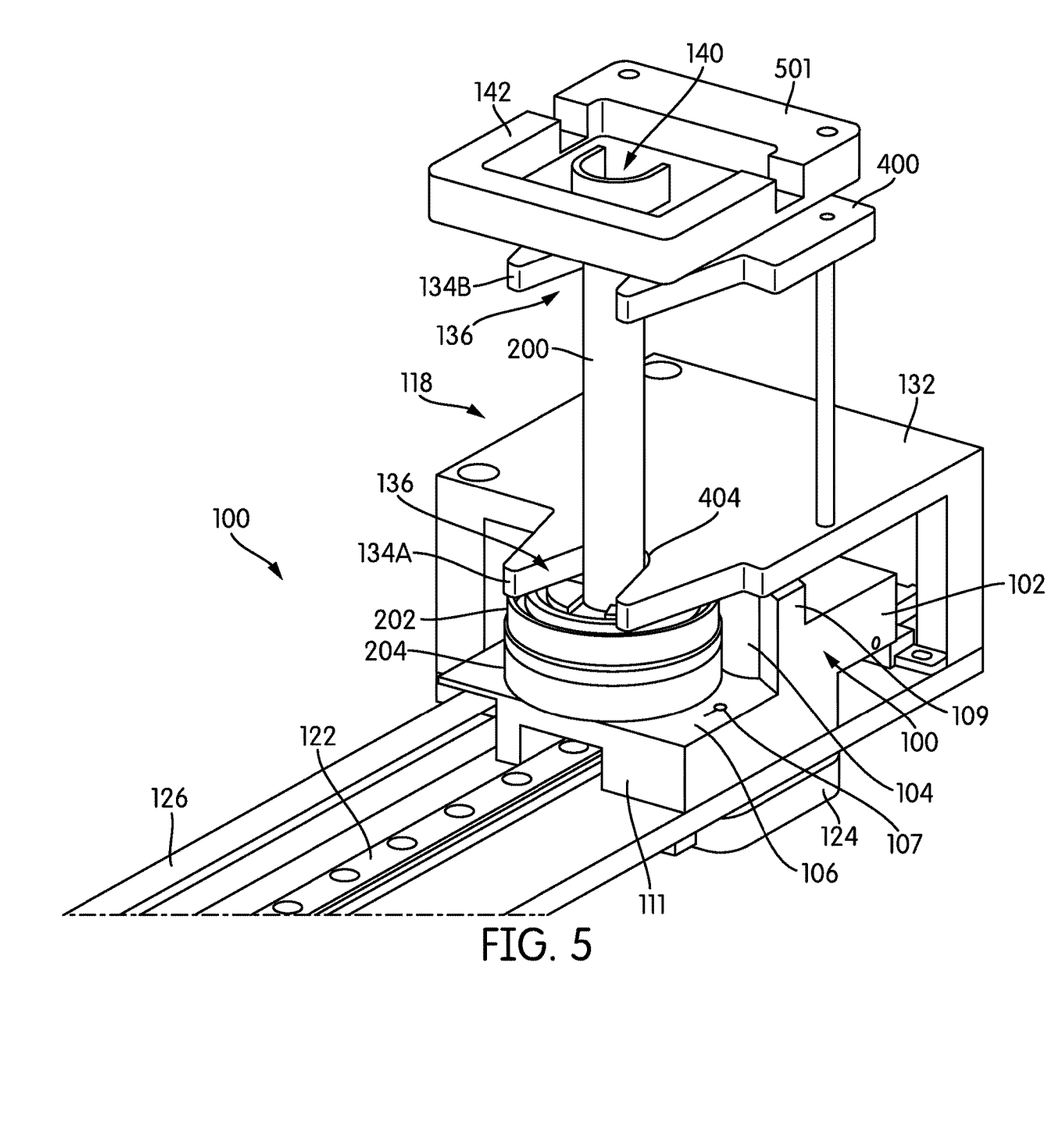
FIG. 5 is a partial perspective view of a sample receptacle carrier transport apparatus with a dock at a second position, according to an embodiment.

In some embodiments, magnets 108 are coupled to second carrier support portion 109. For example, second carrier support portion 109 can define channels 110, as shown in FIGS. 4 and 6, in which magnets 108 can be inserted. In other embodiments, magnets 108 can be disposed on a surface of second carrier support portion 109.

In other embodiments (not shown), magnets 108 can be coupled to first carrier support portion 106. For example, first carrier support portion 106 can define channels in which magnets 108 are inserted. In some of such embodiments, magnetic portion 204 of carrier 202 can be positioned at a bottom portion of carrier 202.

As best shown in FIG. 7, magnets 108 can be separated by a distance 112 from surface 104. In such embodiments, magnets 108 do not contact carrier 202, including magnetic portion 204, which can reduce the amount of wear on carrier 202 and noise during operation. In such embodiments, magnets 108 have sufficient magnetic strength to secure sample receptacle carrier 202 such that movement of carrier 202 relative to dock 102 is substantially prevented despite the separation between magnets 108 and carrier 202.

In other embodiments (not shown), magnets 108 can be positioned such that magnets 108 contact carriers 202, including magnetic portion 204. For example, at least an end portion of magnets 108 can be aligned with surface 104 or can protrude slightly from surface 104 such that magnets 108 contact carrier 202.

In some embodiments, dock 102 can also include a third portion 114 extending from second carrier support portion 109 in a direction away from first carrier support portion 104. In some embodiments, third portion 114 is configured to contain or support additional components of transport apparatus 100. For example, third portion 114 can house or support one or more controllers for controlling the operation of transport apparatus 100, sensors (for example, a sensor 138 described further below), or components for operating electromagnets.

Transport apparatus 100 is configured to move sample receptacle carrier 202 between at least two different positions. For example, in some embodiments, dock 102 is configured to move (and thus move carrier 202 coupled therewith) between a first position 116 and a second position 118. The path between first position 116 and second position 118 can be straight, curved, or both.

Figure 1:
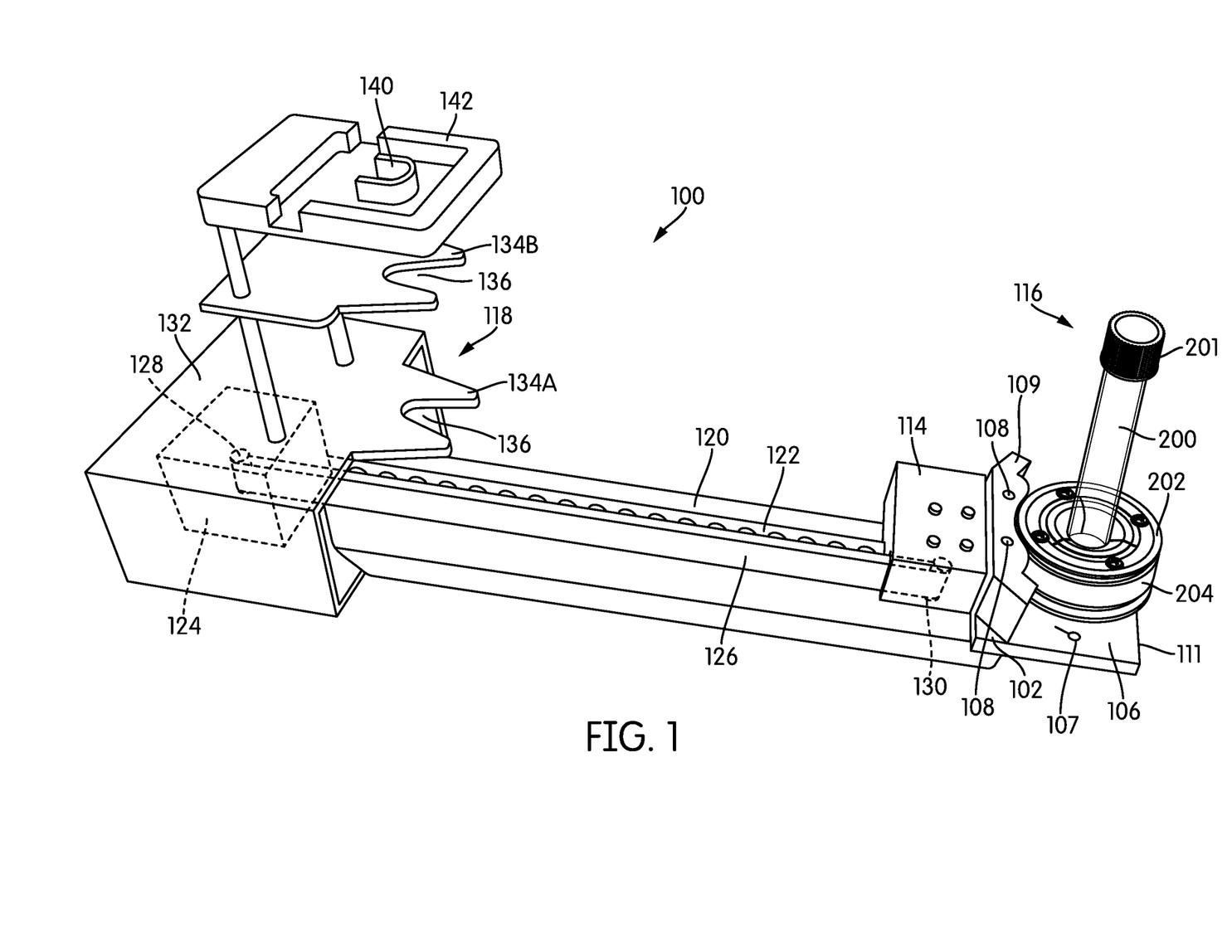
FIG. 1 is a perspective view of a sample receptacle carrier transport apparatus, according to an embodiment.
Figure 2:
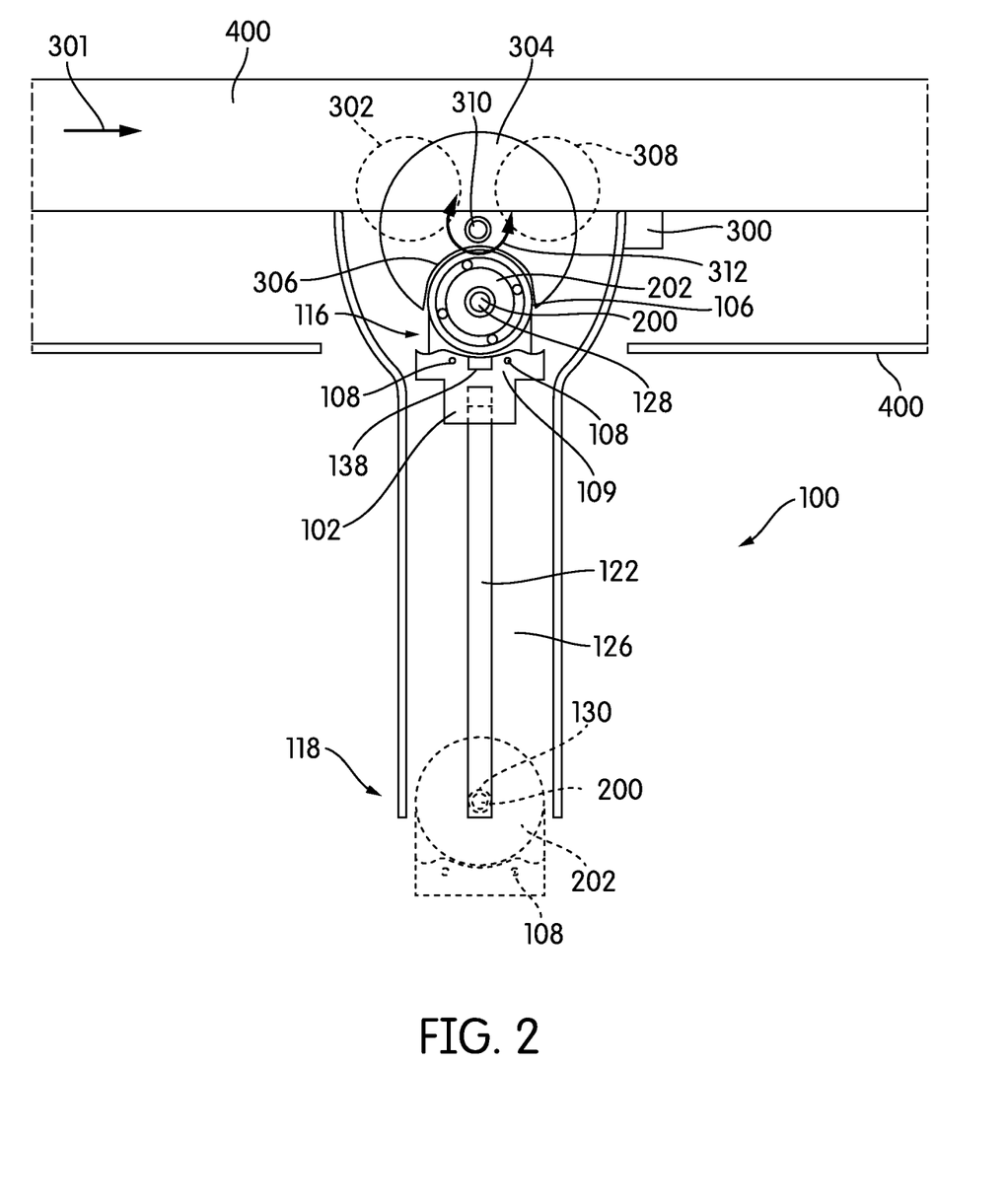
FIG. 2 is a plan view of a system including a sample receptacle carrier transport apparatus, according to an embodiment.

Transport apparatus 100 can include a base 120 to which dock 102 is movably coupled. In some embodiments, transport apparatus 100 includes a rail 122, and dock 102 is slidably coupled to rail 122 via, for example, a tongue and groove interface. Rail 122 defines the path along which dock 102 moves between first position 116 and second position 118. As shown in FIGS. 1 and 2, rail 122 defines a straight path between first and second positions 116 and 118. In other embodiments (not shown), rail 122 can be curved. Although in the illustrated embodiments, dock 102 is movably coupled to base 120 via rail 122, dock 102 can be coupled to base 120 via any other suitable interface for movably coupling dock 102 to base 120.

In some embodiments, transport apparatus 100 also includes a drive assembly that powers and controls movement of dock 102 back and forth between first position 116 and second position 118. For example, the drive assembly can be a belt-pulley drive assembly including a motor 124 configured to rotate a drive belt 126 around first and second pulleys 128 and 130. In this embodiment, first pulley 128 and second pulley 130 are located near opposing ends of rail 122, and drive belt 126 extends between first pulley 128 and second pulley 130. Dock 102 is coupled to belt 126 such that the position of dock 102 relative to belt 126 is fixed. First pulley 128 is coupled to motor 124. When motor 124 is activated, pulley 128 coupled to motor 124 begins to rotate drive belt 126 around pulleys 128 and 130. Since movable dock 102 is coupled to drive belt 126, dock 102 moves as belt 126 rotates. In some embodiments, the drive assembly can be any other suitable drive assembly for moving dock 102 between first and second positions 116 and 118. For example, the drive assembly can include hydraulic pistons or other similar linear actuators.

Transport apparatus 100 can also include a processing support subassembly 132. Processing support subassembly 132 can be positioned adjacent second position 118 of dock 102. Processing support subassembly 132 is configured to engage carrier 202, receptacle 200 coupled to carrier 202, or both, when dock 102 is at second position 118. Processing support subassembly 132 is configured to align receptacle 200 coupled to carrier 202 that is at second position 118 with a desired orientation for subsequent processing (e.g., aspirating a sample from receptacle 200 or moving receptacle 200). In some embodiments, support subassembly 132 can include first and second alignment plates 134A and 134B configured to automatically align receptacle 200 coupled to carrier 202 that is at second position 118 with a desired orientation. The desired orientation can be aligned with, for example, the direction of travel (for example, in a vertical direction) of a robotic arm, such as an automated pipettor or a pick-and-place arm. Alignment plates 134A and 134B can each define a recess 136 (for example, a triangular recess as shown) configured to receive respective portions of receptacle 200 coupled to carrier 202 that is at second position 118. As the respective portions of receptacle 200 are received within recesses 136 defined by alignment plates 134A and 134B, receptacle 200 is automatically aligned with the desired orientation, for example, the direction of travel of the robotic arm or with an opening 140 defined by a cover 142.

Figure 3:
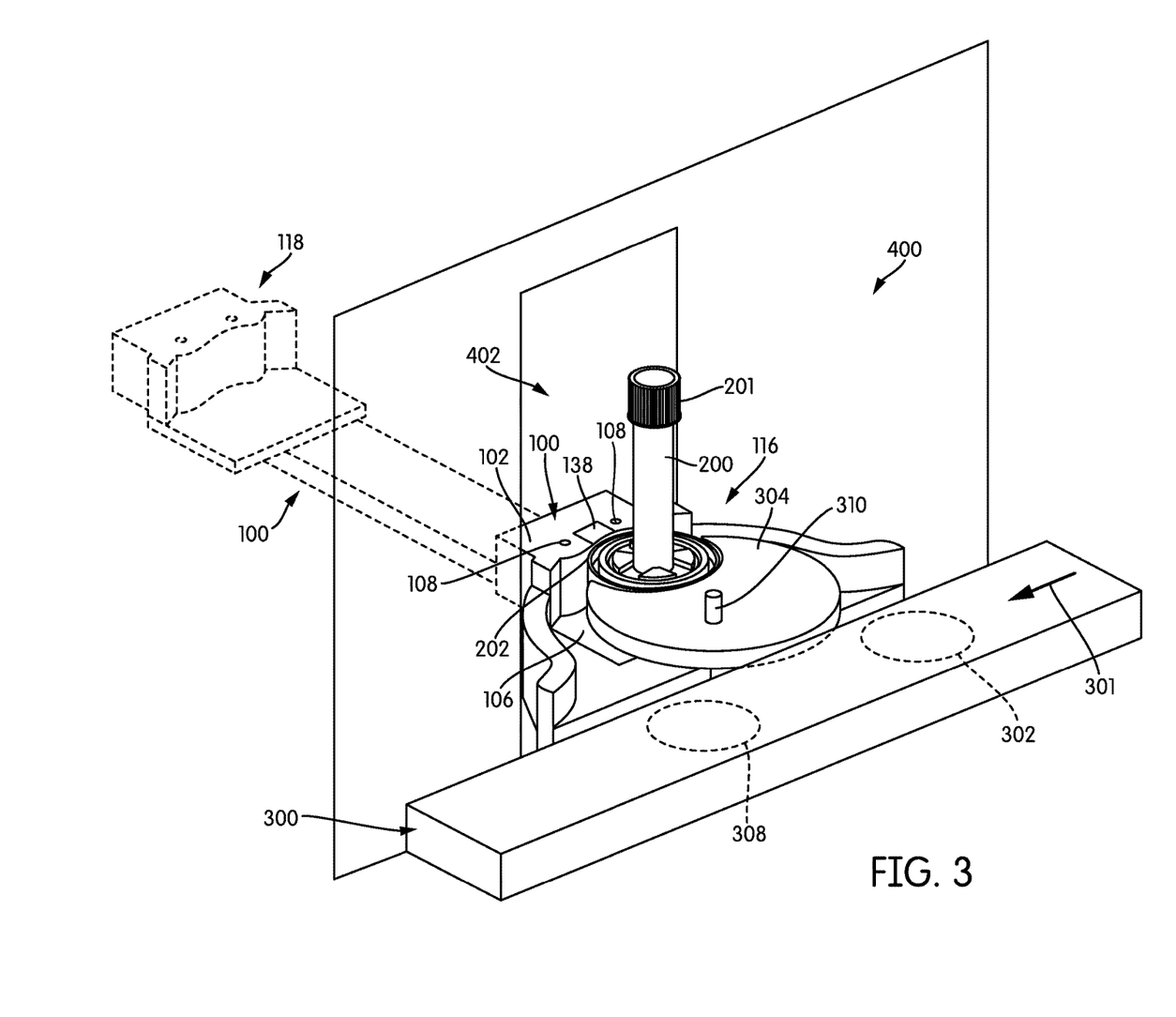
FIG. 3 is a perspective view of a system including a sample receptacle carrier transport apparatus, according to an embodiment.

In some embodiments, transport apparatus 100 is part of a sample processing instrument 400 as shown in FIGS. 2 and 3. In some of such embodiments, first position 116 is outside the housing of instrument 400, and second position 118 is inside the housing of instrument 400. In such embodiments, the housing of instrument 400 can define an opening 402 (as shown in FIG. 3) through which transport apparatus 100 moves carrier 202 from first position 116 outside instrument 400 to second position 118 inside instrument 400.

In other embodiments (not shown) in which transport apparatus 100 is part of a sample processing instrument 400, first position 116 is inside the housing of instrument 400. In such embodiments, transport apparatus 100 moves carrier 202 between at least two positions within the housing of instrument 400.

Figure 9:
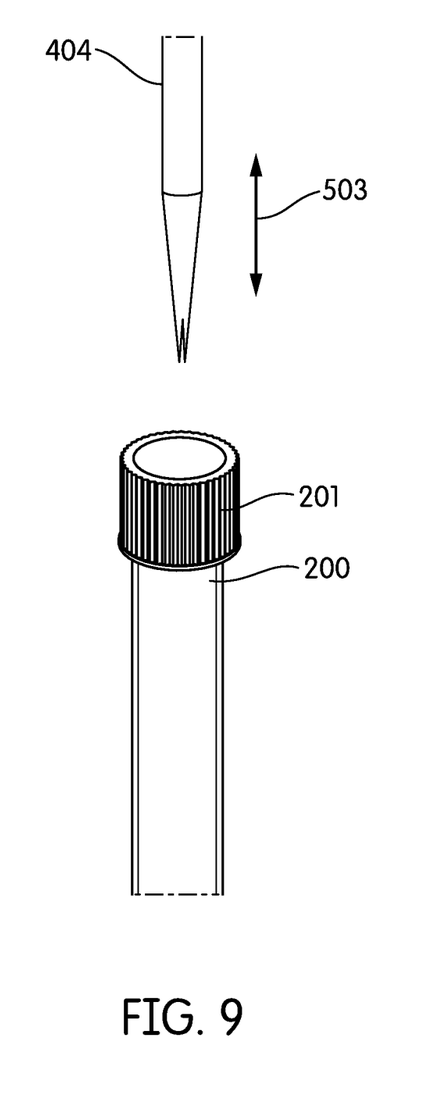
FIG. 9 is a perspective view of a sample receptacle and an automated pipettor, according to an embodiment.

In some embodiments, sample processing instrument 400 is configured to process receptacle 200 when carrier 202 is at second position 118. For example, at least a portion of a sample contained within sample receptacle 200 coupled to carrier 202 that is at second position 118 can be aspirated. The sample can be aspirated, for example, using a robotic arm having an automated pipettor 404. FIG. 9 illustrates automated pipettor 404 of instrument 400 according to an embodiment. In some embodiments, automated pipettor 404 can penetrate through one or more layers of sample receptacle cap 201 to aspirate a sample contained within sample receptacle 200. For example, sample cap 201 may be any one of the disclosed penetrable caps having one or more frangible seals (such as a metallic foil) disclosed in U.S. Pat. No. 8,685,347, which is incorporated by reference herein. And automated pipettor 404 can penetrate through the one or more frangible seals of such penetrable caps. Once a sample is aspirated, automated pipettor 404 may be withdrawn. Sample receptacle 200 and sample receptacle carrier 202 may experience an upward force away from dock 102 due to frictional forces between automated pipettor 404 and the one or more layers of sample receptacle cap 201 (e.g., the one or more frangible seals of a penetrable receptacle cap). In some embodiments, magnets 108 generate sufficient magnetic force to prevent sample receptacle carrier 202 from substantially moving relative to dock 102 as automated pipettor 404 is withdrawn from receptacle 200.

Figure 10:
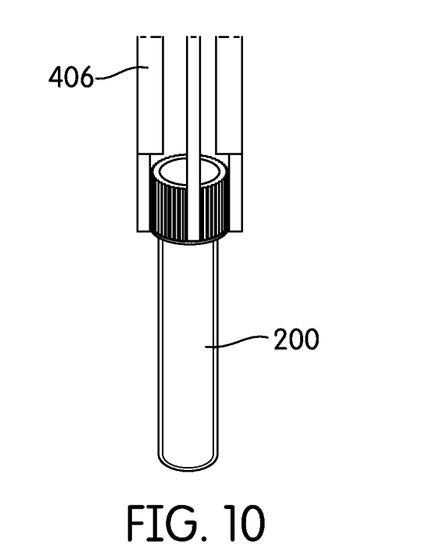
FIG. 10 is a perspective view of a sample receptacle and a pick-and-place robotic arm, according to an embodiment.
Figure 11:
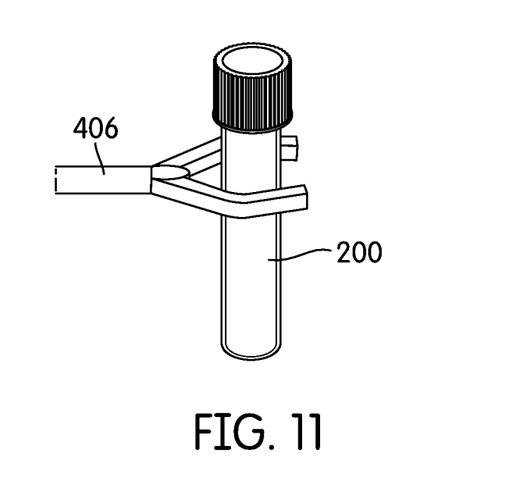
FIG. 11 is a perspective view of a sample receptacle and a pick-and-place robotic arm, according to an embodiment.

In other embodiments, receptacle 200 can be processed by manipulation by a robotic arm. For example, a pick-and-place arm 406 of instrument 400 can engage and move sample receptacle 200 coupled to carrier 202 that is at second position 118. In some embodiments, pick-and-place arm 406 can grasp receptacle 200 and disengage it from carrier 202 as dock 102 secures carrier 202 in place. In such embodiments, magnets 108 generate sufficient magnetic force to prevent carrier 202 from substantially moving relative to dock 102 as pick-and-place arm 406 applies a force to receptacle 200 and, consequently, to carrier 202. FIGS. 10 and 11 illustrate exemplary pick-and-place arms 406 of instrument 400 that can manipulate receptacle 200 when carrier 202 is at second position 118.

In some embodiments, transport apparatus 100 receives carrier 202 from a conveyor assembly 300, for example, a buffer conveyor subassembly or a host conveyor assembly as disclosed in U.S. Provisional Application No. 62/322,491, filed Apr. 14, 2016, and U.S. Provisional Application No. 62/297,348, filed Feb. 19, 2016. A conveyor assembly 300 can move a carrier 202 in a direction 301 to a transfer position 302. At transfer position 302, a diverter 304 may engage carrier 202 and move carrier 202 from transfer position 302 onto surface 107 of dock 102 at first position 116. Diverter 304 changes (in some embodiments, selectively changes) the position of carrier 202, for example, from one position along one path to another position along another path. In some embodiments, diverter 304 defines a recess 306 configured to receive at least a portion of carrier 202 at transfer position 302. Diverter recess 306 may have a substantially half circular shape as best shown in FIGS. 2 and 3. Diverter 304 may have a generally circular shape with a plurality of diverter recesses 306 formed therein. In some embodiments diverter 304 may be referred to as a disc diverter in when formed in select shapes. Diverter 304 can be driven by a powered axle 310 in some embodiments. Axle 310 can rotates diverter 304 about the axis defined by axle 310 as shown be arrow 312. In some embodiments, diverter 304 may also be used to return carrier 202 to conveyor assembly 300 after sample receptacle 200 coupled to carrier 202 has been processed. For example, diverter 304 can move carrier 202 from surface 107 of dock 102 at first position 116 to a second transfer position 308 (shown in FIGS. 2 and 3) on conveyor assembly 300. In some embodiments, dock 102 and diverter 304 are collectively configured such that, when diverter 304 moves carrier 202 from transfer position 302 onto surface 107 of dock 102, carrier 202 contacts surface 104 of second carrier support portion 109.

In some embodiments, the movable surface of conveyor assembly 300 is substantially planar with surface 107 of dock 102. This relative orientation allows diverter 304 to easily transfer carrier 202 from conveyor assembly 300 to transport apparatus 100 by simply rotating diverter 304.

After diverter 304 moves carrier 202 onto surface 107 of dock 102 that is at first position 116, magnets 108 can be magnetically coupled with magnetic portion 204 of carrier 202. For example, if magnets 108 are electromagnets, magnets 108 can be activated to magnetically couple with magnetic portion 204 of carrier 202. In such embodiments, transport apparatus can include a sensor 138 configured to sense the presence of carrier 202 adjacent dock 102, for example, when a carrier 202 is on surface 107 of dock 102. Sensor 138 may use optical or pressure sensing to determine when carrier 202 is on surface 107 of dock 102. Sensor 138 can also transmit a control signal to a controller. The controller can be operatively coupled to magnets 108. When the controller receives the control signal from sensor 138 that indicates the presence of carrier 202, the controller can activate magnets 108 thereby magnetically coupling carrier 202 to dock 102. In some embodiments, instead of using sensor 138, magnets 108 can be activated by a timer. The timer may activate magnets 108 at a pre-determined time after diverter 304 moves carrier 202 from transfer position 302 to dock 102 that is at first position 116. When magnets 108 are activated, magnetic portion 204 of sample receptacle carrier 202 is magnetically coupled to dock 102 via magnets 108. The magnetic engagement between magnets 108 and magnetic portion 204 of the sample receptacle carrier 202 secures sample receptacle carrier 202 to movable dock 102, substantially preventing movement of carrier 202 relative to dock 102.

In other embodiments, magnets 108 can be permanent magnets. In such embodiments, magnets 108 can be magnetically coupled to magnetic portion 204 of carrier 202 substantially simultaneously with carrier 202 being moved onto surface 107 of dock 102 at first position 116. That is, once carrier 202 is moved on dock 102, magnetic portion 204 of carrier 202 is within the magnetic field of magnets 108.

After magnets 108 are magnetically coupled to magnetic portion 204 of carrier 202, dock 102 moves from first position 116 to second position 118 in some embodiments.

At second position 118, sample processing instrument 400 can process receptacle 200 coupled to carrier 202. Again, for example, at least a portion of a sample contained within sample receptacle 200 can be aspirated, or receptacle 200 can be manipulated. After processing is complete, dock 102 moves from second position 118 back to first position 116. In other embodiments (not shown), dock 102 moves from second position 118 to a third position different than the first and second positions 116 and 118.

Figure 12:
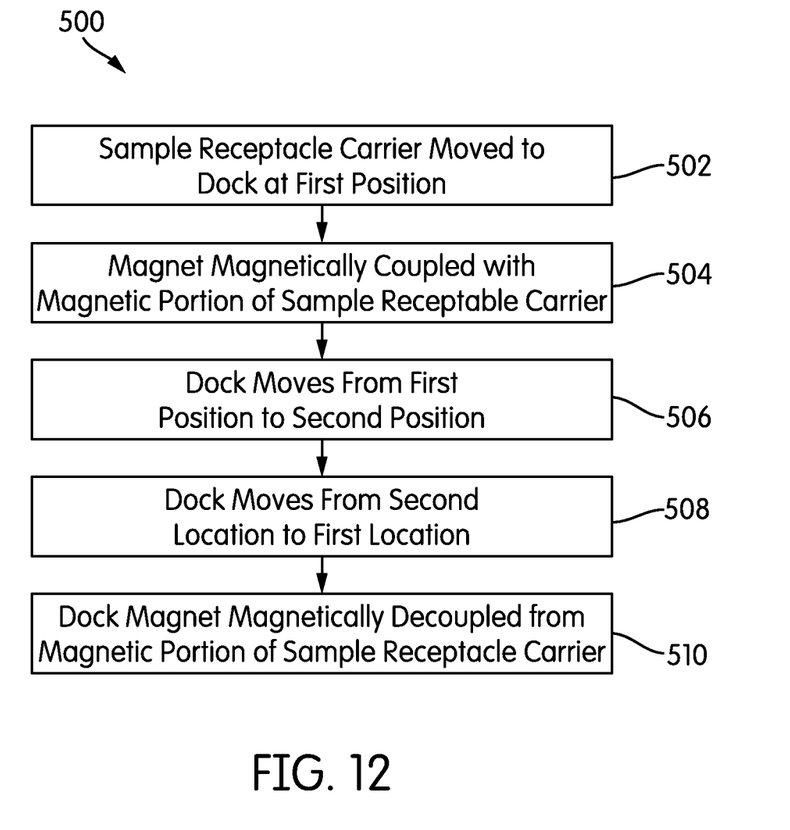
FIG. 12 is a schematic block diagram of a method of transporting a sample receptacle carrier, according to an embodiment.

FIG. 12 describes a method 500 of moving a carrier 202 according to an embodiment. In some embodiments, method 500 begins at step 502 by moving sample receptacle carrier 200 to dock 102, for example, onto surface 107 of dock 102 that is at first position 116. Next, at step 504, magnets 108 are magnetically coupled with magnetic portion 204 of carrier 202. For example, in some embodiments in which magnets 108 are electromagnets, sensor 138 senses sample receptacle carrier 202 on dock 102, and in response to the sensor's signal, magnets 108 are activated to magnetically couple with magnetic portion 204 of carrier 202. In another embodiment in which magnets 108 are permanent magnets, magnets 108 magnetically couple with magnetic portion 204 substantially simultaneously with step 502—when carrier 202 enters the magnetic field of magnets 108.

Once sample receptacle carrier 202 is magnetically coupled with dock 102 via magnets 108, dock 102 of carrier transport apparatus 100 can move from first position 116 to a second position 118, thereby moving carrier 202, at step 506. When carrier 202 is at second position 118, instrument 400 can, in some embodiments, process receptacle 200. Such processing includes, for example, aspirating a portion of a sample contained in receptacle 200 coupled to carrier 202 at position 118, or in some embodiments, manipulating receptacle 200, for example, decoupling receptacle 200 from carrier 202 and moving receptacle 200.

Next, at step 508, dock 102 can move back to first position 116 from second position 118. Once sample receptacle carrier 202 is returned to first position 116, magnets 108 of sample receptacle carrier transport apparatus 100 can be decoupled from sample receptacle carrier 202 at step 510. For example, in some embodiments in which magnets 108 are electromagnets, a sensor senses that dock 102 is at first position 116, and in response to the sensor's signal, magnets 108 are deactivated to magnetically decouple from magnetic portion 204 of carrier 202. In another embodiment in which magnets 108 are permanent magnets, magnets 108 can be magnetically decoupled from magnetic portion 204 by directly or indirectly applying a force to carrier 202 that exceeds the magnetic coupling force between magnetic portion 204 of carrier 202 and magnets 108. This decoupling force can be applied, for example, by diverter 304 or any other suitable controllable actuator. In some embodiments, diverter 304 applies the decoupling force to carrier 202 as diverter 304 returns carrier 202 to conveyor assembly 300 after sample receptacle 200 coupled to carrier 202 has been processed. For example, diverter 304 apply the decoupling force as diverter 304 moves carrier 202 from surface 107 of dock 102 at first position 116 to a second transfer position 308 (shown in FIGS. 2 and 3) on conveyor assembly 300.

Although the above described embodiments have been described with reference to sample receptacles, the present disclosure can be used with carriers used to transport other objects. For example, the transport apparatus can be used to move carriers that are coupled to a non-sample-receptacle object, for example, consumer products such as cosmetics and fluid containers.

While the present disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the disclosure requires features or combinations of features other than those expressly recited in the claims. Accordingly, the present disclosure is deemed to include all modifications and variations encompassed within the spirit and scope of the following appended claims.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

While the invention has been described in connection with the above described embodiments, it is to be understood that the invention is not to be limited to the disclosed embodiments, but, on the contrary, is intended to cover various modifications and equivalent arrangements included within the spirit and scope of the appended claims.

All documents referred to herein are hereby incorporated by reference herein. No document, however, is admitted to be prior art to the claimed subject matter.

Furthermore, those of the appended claims which do not include language in the "means for performing a specified function" format permitted under 35 U.S.C. § 112, ¶6, are not intended to be interpreted under 35 U.S.C. § 112, ¶6, as being limited to the structure, material, or acts described in the present specification and their equivalents.

What is claimed is:

1. A method of transporting a sample containing receptacle coupled to a sample receptacle carrier, the method comprising the steps of:
   (a) moving the sample receptacle carrier onto a carrier support portion of a dock;
   (b) magnetically coupling a magnetic portion of the sample receptacle carrier with one or more magnets fixedly contained within or disposed on the dock to secure the sample receptacle carrier to the dock;
   (c) after step (a), moving the dock coupled to the sample receptacle carrier from a first position located adjacent to or within a processing instrument to a second position located within the processing instrument;

(d) at the second position, aspirating a portion of the sample contained within the sample containing receptacle; and (e) performing an assay on the aspirated portion of the sample.

2. The method of claim 1, wherein the assay comprises subjecting the aspirated portion of the sample to nucleic acid amplification reaction conditions.

3. The method of claim 1, further comprising the steps of:

after the aspirating step, moving the dock from the second position to the first position; and magnetically decoupling the magnetic portion of the sample receptacle carrier from the one or more magnets fixedly contained within or disposed on the dock.

4. The method of claim 3, further comprising, after the magnetically decoupling step, the step of moving the sample receptacle carrier away from the dock.

5. The method of claim 1, wherein step (a) comprises diverting the sample receptacle carrier from a conveyor assembly to a position on the dock.

6. The method of claim 1, wherein step (c) comprises moving the dock coupled to the sample receptacle carrier along a sample receptacle carrier track between the first position and the second position.

* * * * *